(12) United States Patent
Chen

(10) Patent No.: US 12,127,258 B2
(45) Date of Patent: Oct. 22, 2024

(54) INFORMATION TRANSMISSION METHOD FOR A RANDOM ACCESS PROCESS AND TERMINAL

(71) Applicant: VIVO MOBILE COMMUNICATION CO., LTD., Guangdong (CN)

(72) Inventor: Xiaohang Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 482 days.

(21) Appl. No.: 17/378,560

(22) Filed: Jul. 16, 2021

(65) Prior Publication Data

US 2021/0345422 A1 Nov. 4, 2021

Related U.S. Application Data

(63) Continuation of application No. PCT/CN2020/072691, filed on Jan. 17, 2020.

(30) Foreign Application Priority Data

Jan. 18, 2019 (CN) .......................... 201910108501.4

(51) Int. Cl.
*H04W 74/0833* (2024.01)
*H04W 72/044* (2023.01)

(52) U.S. Cl.
CPC ..... *H04W 74/0833* (2013.01); *H04W 72/044* (2013.01)

(58) Field of Classification Search
None
See application file for complete search history.

(56) References Cited

U.S. PATENT DOCUMENTS

| 10,231,247 | B2 | 3/2019 | Liu et al. |
| 10,616,019 | B2 | 4/2020 | Wu et al. |
| 2017/0135135 | A1 | 5/2017 | Pelletier et al. |
| 2018/0124626 | A1 | 5/2018 | Tsai et al. |

(Continued)

FOREIGN PATENT DOCUMENTS

| CN | 101771649 A | 7/2010 |
| CN | 104186010 A | 12/2014 |

(Continued)

OTHER PUBLICATIONS

Supplementary European Search Report regarding Patent Application No. 20741098.6-1215/3913838; PCT/CN2020/072691, dated Feb. 17, 2022.

(Continued)

*Primary Examiner* — Christine T Duong
(74) *Attorney, Agent, or Firm* — Harness, Dickey & Pierce, P.L.C.

(57) ABSTRACT

An information transmission method for a random access process includes: obtaining a preset mapping relationship between a physical uplink shared channel resource and a physical random access channel resource; and sending a random access message on a random access resource according to the preset mapping relationship. The random access resource comprises the PUSCH resource and the (Continued)

PRACH resource. When a random access channel occasion corresponding to the PRACH resource is not associated with an SSB, the RO is not associated with the PUSCH resource.

12 Claims, 7 Drawing Sheets

(56) References Cited

U.S. PATENT DOCUMENTS

| | | | |
|---|---|---|---|
| 2019/0335443 A1 | 10/2019 | Liu et al. | |
| 2021/0136815 A1 | 5/2021 | Kim et al. | |
| 2021/0282169 A1* | 9/2021 | Zhang | H04W 72/56 |
| 2021/0345424 A1* | 11/2021 | Cirik | H04W 74/02 |
| 2023/0156808 A1* | 5/2023 | Kim | H04L 1/189 |
| | | | 370/329 |

FOREIGN PATENT DOCUMENTS

| | | |
|---|---|---|
| CN | 104854949 A | 8/2015 |
| CN | 108243508 A | 7/2018 |
| CN | 108289016 A | 7/2018 |
| CN | 108738138 A | 11/2018 |
| KR | 20180122561 A | 11/2018 |
| WO | WO-2017031725 A1 | 3/2017 |
| WO | WO-2017166254 A1 | 10/2017 |
| WO | WO-2020142683 A1 | 7/2020 |

OTHER PUBLICATIONS

"2-Step RACH Procedure," InterDigital, 3GPP TSG-RAN WG2 Meeting #103bis, R2-1814008, dated Oct. 12, 2018.

"PRACH resource selection for SSB and CSI-RS," vivo, 3GPP TSG-RAN WG2 Meeting #103, R2-1811918, dated Aug. 24, 2018.

International Search Report and Written Opinion of the International Searching Authority regarding International Patent Application No. PCT/CN2020/072691, dated Apr. 15, 2020. Translation provided by Bohui Intellectual Property.

"NR two-step random access procedure," Ericsson, 3GPP TSG-RAN WG1 NR adhoc, R1-1700300, dated Jan. 20, 2017.

"Msg1-based on-demand SI request," Spreadtrum Communications, 3GPP TSG-RAN WG2 #101Bis, R2-1804469, dated Apr. 20, 2018.

First Office Action regarding Chinese Patent Application No. 201910108501.4, dated Nov. 3, 2020. Translation provided by Bohui Intellectual Property.

Second Office Action regarding Chinese Patent Application No. 201910108501.4, dated May 25, 2021. Translation provided by Bohui Intellectual Property.

\* cited by examiner

INFORMATION TRANSMISSION METHOD FOR A RANDOM ACCESS PROCESS AND TERMINAL

CROSS-REFERENCE TO RELATED APPLICATIONS

This application is a Bypass Continuation application of PCT/CN2020/072691 filed on Jan. 17, 2020, which claims priority to Chinese Patent Application No. 201910108501.4 filed on Jan. 18, 2019, which are incorporated herein by reference in their entirety.

TECHNICAL FIELD

The present disclosure relates to the field of communications technologies, and in particular, to an information transmission method for a random access process and a terminal.

BACKGROUND

The 5-th generation (5G) mobile communication system, or called the new radio (NR) system needs to adapt to diverse scenarios and service requirements. Main scenarios of the NR system include enhanced Mobile Broadband (eMBB) communications, large-scale Internet of Things (mMTC) communications, and ultra-reliable and low latency communications (URLLC). These scenarios require for high reliability, low latency, large bandwidth, wide coverage, and the like of the system. For a periodic service that has a fixed data packet size, in order to reduce overheads of downlink control signaling, a network device can use semi-static scheduling to continuously allocate certain resources for transmission of the periodic service.

SUMMARY

The embodiments of the present disclosure provide an information transmission method for a random access process and a terminal.

According to a first aspect, an embodiment of the present disclosure provides an information transmission method for a random access process, applied to a terminal side, including:

obtaining a preset mapping relationship between a physical uplink shared channel resource and a physical random access channel resource; and sending a random access message on a random access resource according to the preset mapping relationship, where the random access resource includes the PUSCH resource and the PRACH resource.

According to a second aspect, an embodiment of the present disclosure further provides a terminal, including:

an obtaining module, configured to obtain a preset mapping relationship between a physical uplink shared channel resource and a physical random access channel resource; and a sending module, configured to send a random access message on a random access resource according to the preset mapping relationship, where the random access resource includes the PUSCH resource and the PRACH resource.

According to a third aspect, an embodiment of the present disclosure provides a terminal, including a processor, a memory, and a computer program stored in the memory and executable on the processor. The computer program, when executed by the processor, implements the steps of the foregoing information transmission method for a random access process.

According to a fourth aspect, an embodiment of the present disclosure provides a non-transitory computer-readable storage medium. The non-transitory computer-readable storage medium stores a computer program, and the computer program, when executed by a processor, implements the steps of the foregoing information transmission method for a random access process.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF EMBODIMENTS

Figure 1:
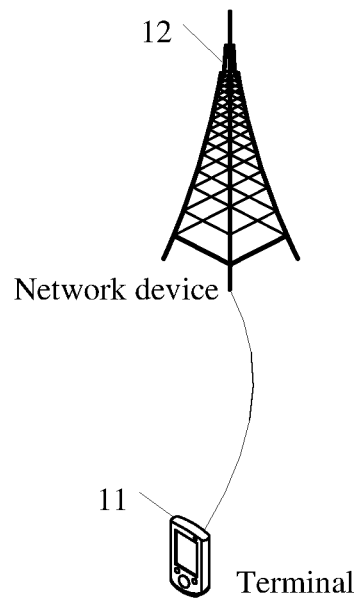
FIG. 1 is a block diagram of a mobile communications system to which an embodiment of the present disclosure can be applied.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to convey the scope of the present disclosure to those skilled in the art.

Terms "first,", "second", or the like in the description and claims of this application are used to distinguish similar objects, instead of describing a specific sequence or order. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to the Long Term Evolution (LTE)/LTE-Advanced (LTE-A) system. It can also be applied in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims.

The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

In an uplink transmission mode, if a terminal needs to send uplink data, the terminal first obtains uplink timing synchronization through a random access process, that is, obtains uplink timing advance (TA) information from the network device. After obtaining uplink synchronization, the terminal can send uplink data through dynamic scheduling or semi-static scheduling. When an uplink data packet is small, in order to reduce resource and power consumption, the terminal can send uplink data in an asynchronous state.

In the random access process, such as contention-free random access process or contention-based random access process, the terminal is also in an asynchronous state when sending a preamble, and a cyclic prefix (CP) needs to be added to the preamble to offset the impact of a transmission delay. There is a guard interval between different terminals to reduce interference.

When the terminal sends uplink data in the asynchronous state, for example, when the terminal sends a physical uplink shared channel (PUSCH) in the asynchronous state, in the contention-free random access process, that is, a 2-step physical random access channel (PRACH), when the terminal initiates random access, the terminal sends a random access message carrying the PUSCH, that is, a message A (msgA). In this case, the msgA received by the network device corresponds to both the PRACH and the PUSCH, and the network device needs to blindly detect all possible PRACH and PUSCH transmission positions. Therefore, processing complexity is high.

Referring to FIG. 1, FIG. 1 is a block diagram of a wireless communications system to which an embodiment of the present disclosure can be applied. The wireless communications system includes a terminal 11 and a network device 12. The terminal 11 can also be called a terminal device or a user terminal (UE), and terminal 11 may be a mobile phone, a tablet personal computer, a laptop computer, a personal digital assistant (PDA), a mobile internet device (MID), a wearable device, an on-board device, or other terminal devices. It should be noted that a specific type of the terminal 11 is not limited in embodiments of the present disclosure. The network device 12 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in embodiments of the present disclosure, the base station in the NR system is merely used as an example, but does not limit a specific type of the base station.

The base station can communicate with the terminal 11 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on multiple carriers (waveform signals of different frequencies). A multi-carrier transmitter can simultaneously transmit a modulated signal on the multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 11 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

Communications links in a wireless communication system may include an uplink for carrying an uplink (UL) transmission (for example, a transmission from the terminal 11 to the network device 12), or a downlink for carrying a downlink (DL) transmission (for example, a transmission from the network device 12 to the terminal 11). The UL transmission may also be referred to as reverse link transmission, and the DL transmission may also be referred to as forward link transmission. The downlink transmission may be performed over a licensed frequency band, an unlicensed frequency band, or the both. Similarly, the uplink transmission may be performed over a licensed frequency band, an unlicensed frequency band, or the both.

Figure 2:
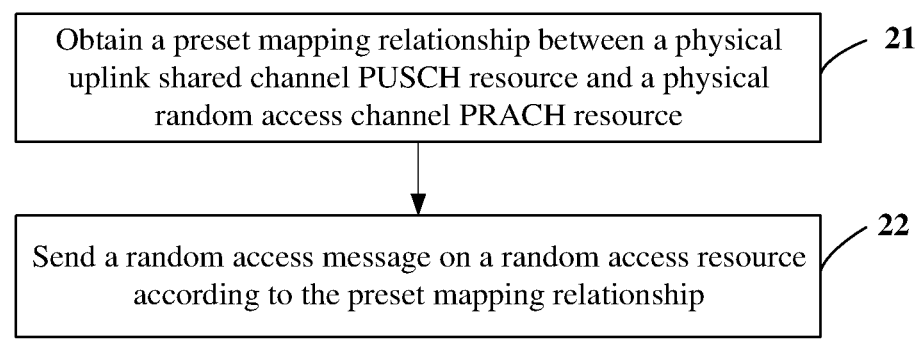
FIG. 2 is a flowchart of an information transmission method for a random access process according to an embodiment of the present disclosure.

As shown in FIG. 2, an embodiment of the present disclosure provides an information transmission method for a random access process, applied to a terminal side, including:

Step 21: Obtain a preset mapping relationship between a physical uplink shared channel PUSCH resource and a physical random access channel PRACH resource.

The preset mapping relationship can be agreed upon by the protocol or configured by a network device. For example, it is agreed in the protocol that the PRACH resource and the PUSCH resource are independently numbered, and an association relationship between a PRACH resource number and a PUSCH resource number is provided.

Step 22: Send a random access message on a random access resource according to the preset mapping relationship.

The random access resource is used in a random access process, and the random access resource includes the PUSCH resource and the PRACH resource. The PRACH resource is used to transmit a random access preamble, and the PUSCH resource is used to transmit information or uplink data related to random access. Correspondingly, the network device determines the PUSCH resource and the PRACH resource on the random access resource according to the same understanding as the terminal, so that the network device can quickly detect and demodulate the random access message (msgA) on the random access resource, to ensure normal progress of the random access process.

In the foregoing solution, a preset mapping relationship between a physical uplink shared channel PUSCH and a physical random access channel PRACH is obtained; and the random access message is sent on the random access resource. In this way, transmission positions on the PUSCH resource and the PRACH resource can be determined according to the mapping relationship between the PUSCH and the PRACH, or a transmission position on the PRACH resource can be determined according to a transmission position on the PUSCH resource, or a transmission position on the PUSCH resource can be determined according to a transmission position on the PRACH resource. This can avoid blind detection of transmission positions on all possible PRACH resources and PUSCH resources, thereby reducing processing complexity and improving processing efficiency.

In addition, if multiple terminals that send the random access message use a same PRACH preamble, because there is a many-to-many correspondence between PRACH resources and PUSCH resources, after the network device detects the preamble, the network device can detect and receive the PUSCH of the random access message according to different PUSCH resources associated with the preamble, which is conducive to improving the access success rate.

The preset mapping relationship may include: a first mapping relationship between the PUSCH resource of the random access resource and a random access channel occasion (RO) corresponding to the PRACH resource.

In the NR system, a network device can configure that in a time instance, there are multiple physical random channel transmission occasions (PRACH occasion, or simply referred to as RO) that are frequency division multiplexed (FDM). The time instance is duration required for a physical random channel (PRACH), or a time domain resource used to transmit a PRACH. The number of ROs that can perform FDM in a time instance can be: {1, 2, 4, 8}.

For example, the first mapping relationship indicates that a PUSCH resource is associated with at least two RO, where one RO correspond to at least one random access preamble. In this case, all random access preambles corresponding to the at least two ROs are all associated with a same PUSCH resource.

Alternatively, the first mapping relationship indicates that N PUSCH resources are associated with one RO.

One RO corresponds to R random access preambles, and N and R are both positive integers. Optionally, the first mapping relationship can also indicate that S of the R random access preambles are associated with one PUSCH resource, where R is an integer multiple of S, for example, R is N times of S.

The random access preamble can only be transmitted on a time domain resource configured by a parameter of a PRACH configuration index and a frequency domain resource configured by a parameter of prach-FDM. A PRACH frequency domain resource $N_{RA} \in \{0, 1, \ldots, M-1\}$, where M is equal to a high-level parameter of prach-FDM. During initial access, the PRACH frequency domain resource $N_{RA}$ is numbered in ascending order starting from an RO resource with the lowest frequency in an initial active uplink bandwidth part. Otherwise, the PRACH frequency domain resource $N_{RA}$ is numbered in ascending order starting from an RO resource with the lowest frequency in an active uplink bandwidth part.

The PUSCH resource includes time domain and frequency domain and/or demodulation reference signal ports (DMRS ports).

For example, if the PUSCH resource refers to a time-frequency domain resource, N PUSCH resources represent N PUSCH time-frequency resource blocks; if the PUSCH resource refers to DMRS ports, N PUSCH resources represent N PUSCH DMRS ports; if the PUSCH resource refers to time-frequency domain resources and DMRS ports, there are N1 time-frequency domain resource blocks and N2 DMRS ports, where N=N1×N2.

The preset mapping relationship may further include: a second mapping relationship between the PUSCH resource of the random access resource and a synchronization signal block (SSB) corresponding to the PRACH resource.

There is an association relationship between an RO and a synchronization signal and physical broadcast channel block (SS/PBCH block, or SSB for short) that is actually sent. One RO may be associated with multiple SSBs, one SSB may also be associated with multiple ROs, and the number of SSBs associated with one RO can be {⅛, ¼, ½, 1, 2, 4, 8, 16}. In the contention-free random access process, there may also be an association relationship between an RO and a channel state information reference signal (CSI-RS). For example, the number of ROs that can perform FDM in a time instance can be 8, the number of SSBs actually transmitted is 4, namely, SSB0, SSB1, SSB2, and SSB3, and each SSB is associated with 2 ROs. If the terminal sends a PRACH on an RO corresponding to the SSB0, the terminal can only select one RO from RO0 and RO1 to send the PRACH.

For example, the second mapping relationship indicates that one PUSCH resource is associated with at least two SSBs, where one SSB corresponds to a random access preamble of at least one RO. In this case, all random access preambles corresponding to the at least two SSBs are all associated with a same PUSCH resource.

Alternatively, the second mapping relationship indicates that N PUSCH resources are associated with one SSB.

Optionally, the N PUSCH resources are associated with one of SSBs corresponding to an RO, where one RO may correspond to one or more SSBs. In an example, one SSB corresponds to R random access preambles in an RO, and N and R are both positive integers. Optionally, the second mapping relationship can also indicate that T of the R random access preambles corresponding to an SSB are associated with one PUSCH resource, where R is an integer multiple of T, for example, R is N times of T.

In some embodiments, if an SSB is associated with M (M≥1) ROs and a given RO corresponds to R preambles, in the RO, R preambles are associated with N PUSCH resources, where M is a positive integer. For example, in a given RO, T preambles associated with the SSB are associated with a PUSCH resource. In this case, in the RO, the number of corresponding preambles satisfies the following relationship: $R_{total}=R=T \times N$.

If at least two (M>1) SSBs are associated with one RO, R preambles are associated with one SSB in a given RO, and the R preambles are associated with N PUSCH resource. For example: R preambles are associated with the SSBm, m is a positive integer, and m is less than or equal to M−1. In an example, in a given RO, T preambles associated with the SSBm are associated with a PUSCH resource. In this case, in the RO, the number of corresponding preambles satisfies the following relationship: $R_{total}=R \times M=T \times N \times M$.

The PUSCH resource includes time domain and frequency domain and/or demodulation reference signal ports (DMRS ports).

In some embodiments, if the PUSCH resource refers to a time-frequency domain resource, N PUSCH resources represent N PUSCH time-frequency resource blocks; if the PUSCH resource refers to DMRS ports, N PUSCH resources represent N PUSCH DMRS ports; if the PUSCH resource refers to time-frequency domain resources and DMRS ports, there are N1 time-frequency domain resource blocks and N2 DMRS ports, where N=N1×N2.

For example, each of the R random access preambles is associated with the N PUSCH resources.

Specific descriptions are provided below with reference to specific scenarios.

Figure 3:
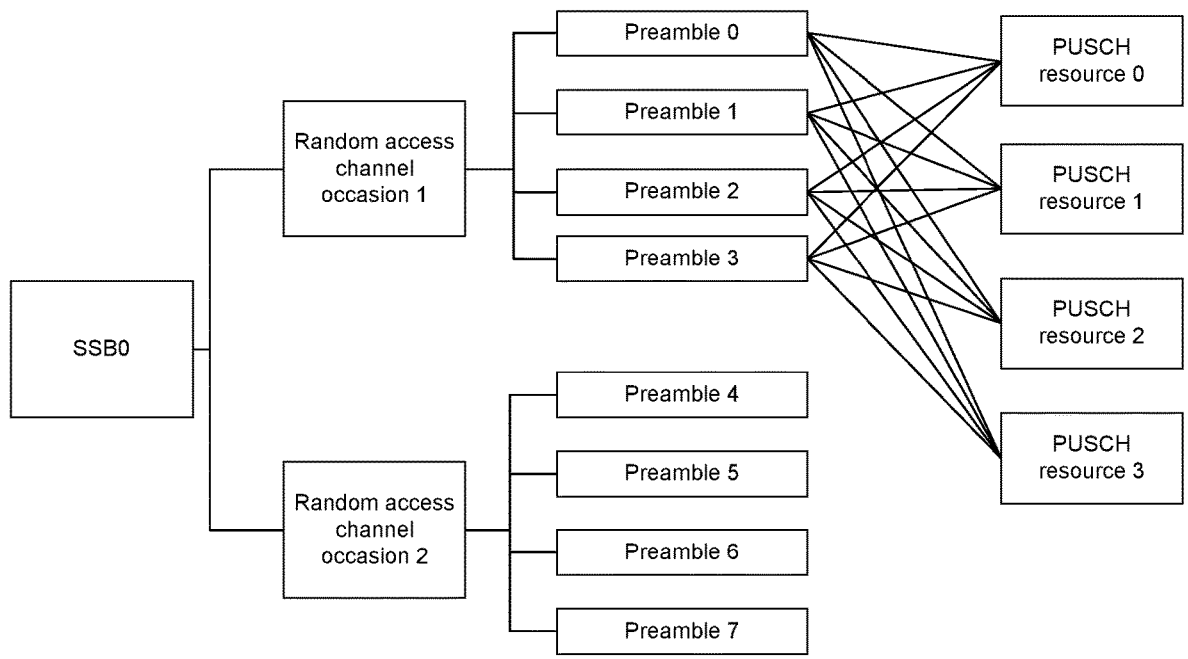
FIG. 3 is a first schematic diagram of a mapping relationship between a PUSCH and a PRACH according to an embodiment of the present disclosure.

Scenario 1:

The terminal is configured with $N_{PUSCH\_total}$ PUSCH resources. N=4 PUSCH resources (including time domain and frequency domain and/or DMRS ports) associated with 1 SSB, 1 SSB is associated with 2 ROs, and $N_{PUSCH\_total}$ is greater than or equal to N, as shown in FIG. 3.

SSB0 is associated with PUSCH resources 0 to 3.

The random access channel occasion RO1 can be used to send R=4 preambles such as preambles 0 to 3, and these 4 preambles are associated with SSB0. In RO1, any one of these 4 preambles (preambles 0 to 3) is associated with PUSCH resources 0 to 3.

RO2 can be used to send preambles 4 to 7, and these 4 preambles are associated with SSB0. In RO2, any one of these 4 preambles (preambles 4 to 7) is associated with PUSCH resources 0 to 3 (similar to RO1, details are not described in FIG. 3).

Figure 4:
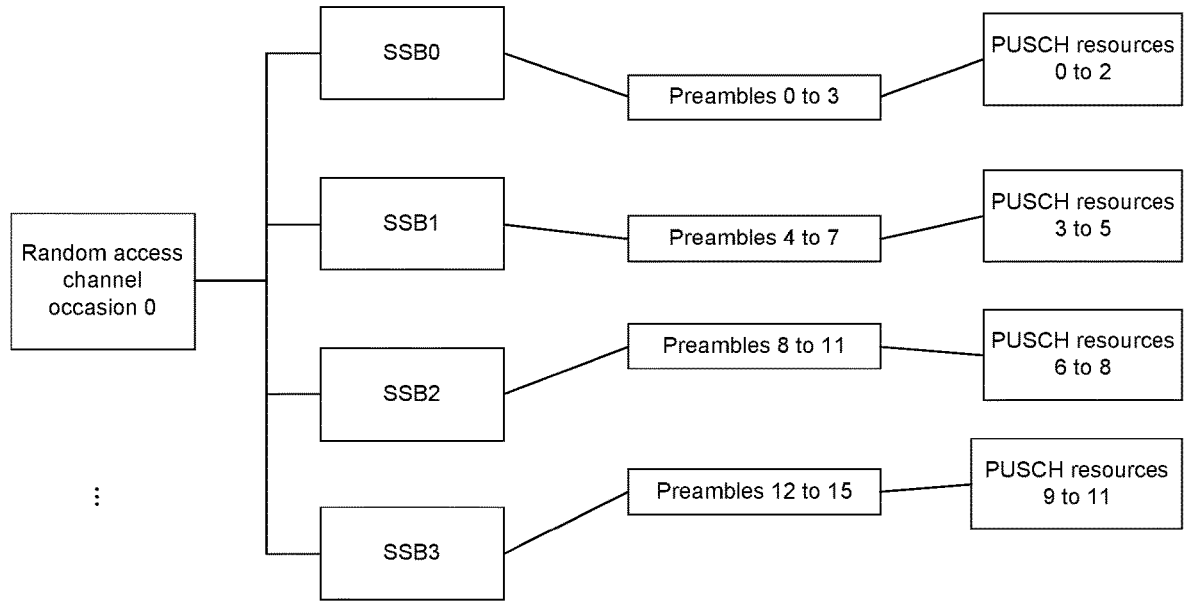
FIG. 4 is a second schematic diagram of a mapping relationship between a PUSCH and a PRACH according to an embodiment of the present disclosure.

Scenario 2:

The terminal is configured with $N_{PUSCH\_total}$ PUSCH resources. N=3 PUSCH resources (including time domain and frequency domain and/or DMRS ports) associated with 1 SSB, 4 SSBs are associated with 1 RO, and $N_{PUSCH\_total}$ is greater than or equal to N, as shown in FIG. 4.

SSB0-3 is associated with the random access channel occasion RO0.

RO0 can be used to send 16 preambles, such as preambles 0 to 15, and each SSB can correspond to 4 preambles, where R=4 preambles are associated with 1 SSB. For example, SSB0 is associated with preambles 0 to 3, SSB1 is associated with preambles 4 to 7, SSB2 is associated with preambles 8 to 11, and SSB3 is associated with preambles 12 to 15.

For SSB0, preambles 0 to 3 are associated with PUSCH resources 0 to 2.

For SSB1, preambles 4 to 7 are associated with PUSCH resources 3 to 5.

For SSB2, preambles 8 to 11 are associated with PUSCH resources 6 to 8.

For SSB3, preambles 12 to 15 are associated with PUSCH resources 9 to 11.

Any one of preambles associated with an SSB is associated with any one of PUSCH resources associated with the SSB. For example, any one of preambles 0 to 3 associated with SSB0 is associated with PUSCH resources 0 to 2.

The following describes the association between R preambles and N PUSCH resources, where N is a positive integer:

Manner 1: when R is less than N, P of the R random access preambles are associated with ceil(N, R) PUSCH resources, and (R−P) of the R random access preambles are associated with floor(N, R) PUSCH resources; where P=mod(N, R).

ceil is a rounding up function, and ceil(N, R) represents rounding up a quotient of dividing N by R. For example: if N=6 and R=4, ceil(N, R) is 2.

floor is a rounding down function, and floor(N, R) represents rounding down a quotient of dividing N by R. For example: if N=6 and R=4, floor(N, R) is 1.

mod is a modulo function, and mod(N, R) represents a remainder of dividing N by R. For example: if N=6 and R=4, mod(N, R) is 2.

Manner 1 is described below with reference to specific scenarios.

Figure 5:
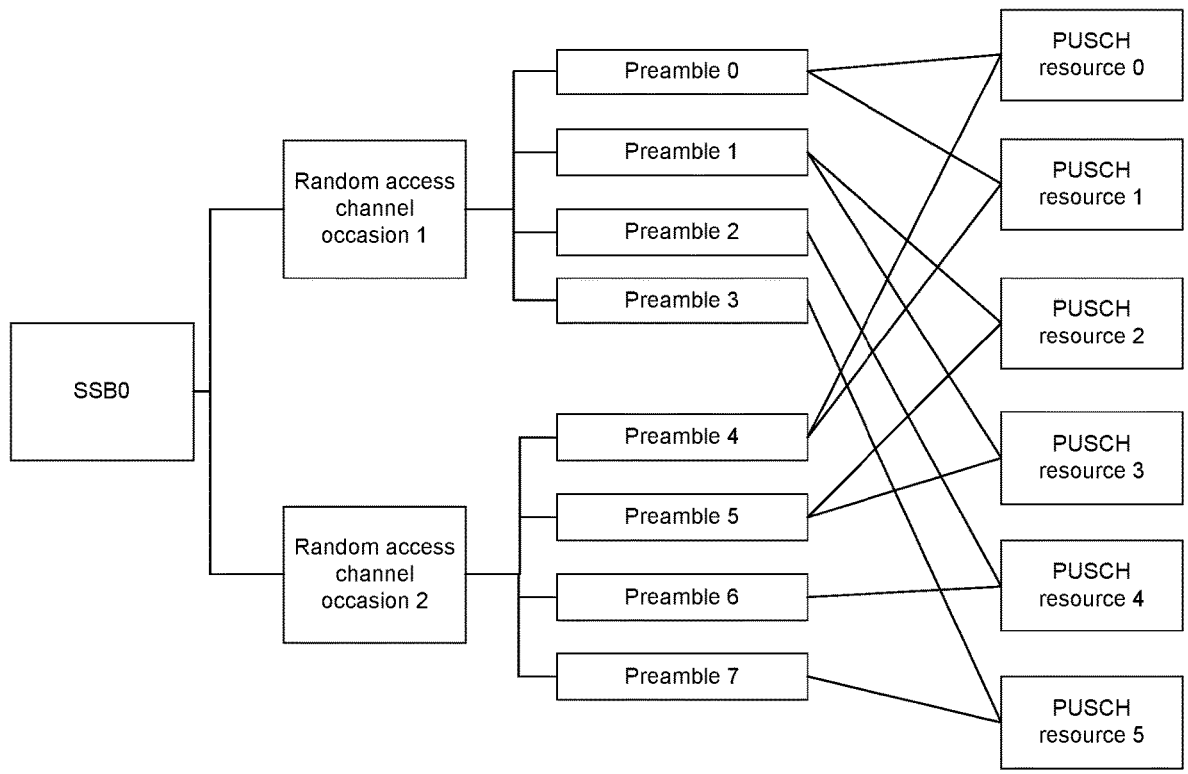
FIG. 5 is a third schematic diagram of a mapping relationship between a PUSCH and a PRACH according to an embodiment of the present disclosure.

Scenario 3:

The terminal is configured with $N_{PUSCH\_total}$ PUSCH resources. N=6 PUSCH resources (including time domain and frequency domain and/or DMRS ports) associated with 1 SSB, 1 SSB is associated with 2 ROs, and $N_{PUSCH\_total}$ is greater than or equal to N, as shown in FIG. 5.

SSB0 is associated with PUSCH resources 0 to 5.

The random access channel occasion RO1 can be used to send R=4 preambles such as preambles 0 to 3, and these 4 preambles are associated with SSB0.

In RO1, for these 4 preambles (preambles 0 to 3), mod(6, 4)=2 preambles. For example: the first two preambles in preambles 0 to 3, that is, preamble 0 and preamble 1 are associated with ceil(6, 4)=2 PUSCH resources. For example: preamble 0 is associated with PUSCH resources 0 and 1, and preamble 1 is associated with PUSCH resources 2 and 3.

The remaining 4-mod(6, 4)=2 preambles of these 4 preambles, that is, preamble 2 and preamble 3, are associated with floor(6, 4)=1 PUSCH resource. For example: preamble 2 is associated with PUSCH resource 4, and preamble 3 is associated with PUSCH resource 5.

RO2 can be used to send preambles 4 to 7, and these 4 preambles are associated with SSB0.

A method of associating these 4 preambles (preambles 4 to 7) with PUSCH resources 0 to 5 in RO2 is similar to the method of associating the 4 preambles (preambles 0 to 3) with PUSCH resources 0 to 5 in RO1 (as shown in FIG. 5, details are not described herein again).

Figure 6:
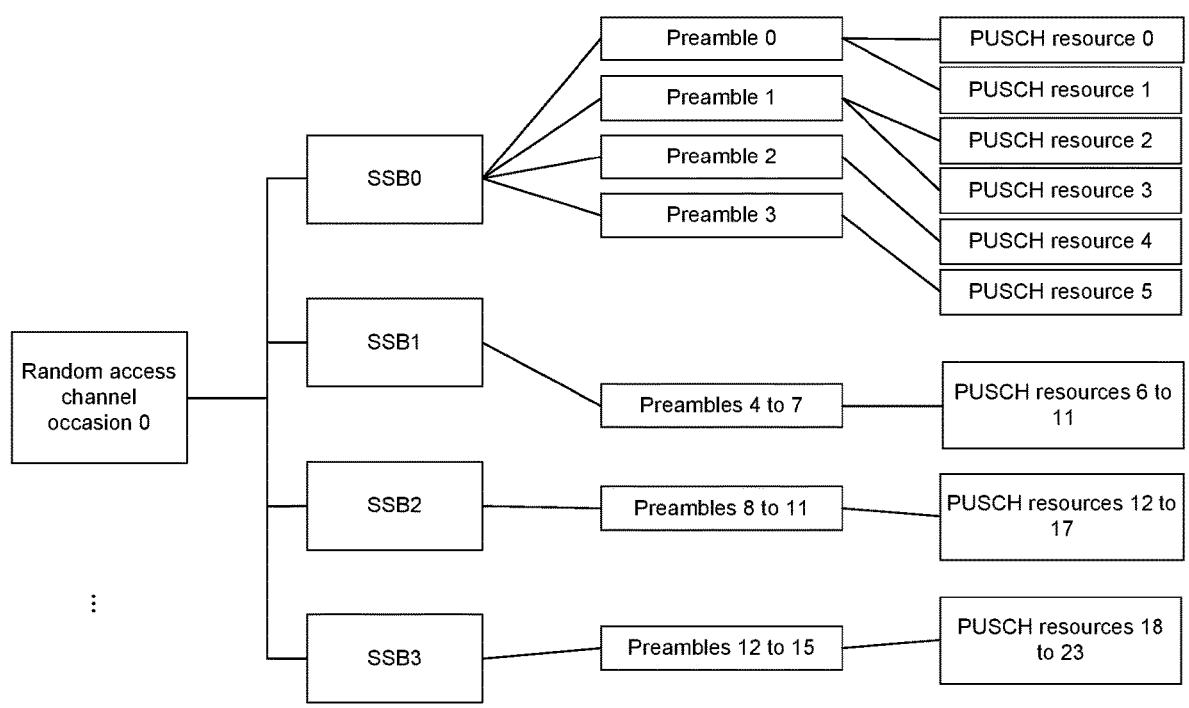
FIG. 6 is a fourth schematic diagram of a mapping relationship between a PUSCH and a PRACH according to an embodiment of the present disclosure.

Scenario 4:

The terminal is configured with $N_{PUSCH\_total}$ PUSCH resources. N=6 PUSCH resources (including time domain and frequency domain and/or DMRS ports) associated with 1 SSB, 4 SSBs are associated with 1 RO, and $N_{PUSCH\_total}$ is greater than or equal to N, as shown in FIG. 6.

SSBs 0 to 3 are associated with the random access channel occasion RO0.

The RO0 can be used to send 16 preambles such as preambles 0 to 15, and R=4 preambles are associated with 1 SSB. For example, SSB0 is associated with preambles 0 to 3, SSB1 is associated with preambles 4 to 7, SSB2 is associated with preambles 8 to 11, and SSB3 is associated with preambles 12 to 15.

For SSB0, SSB0 is associated with preambles 0 to 3, and preambles 0 to 3 are associated with PUSCH resources 0 to 5.

mod(N, R)=2 preambles, which are associated with ceil(N, R)=2 PUSCH resources, and the remaining 4-mod(N, R)=2 preambles, which are associated with floor(N, R)=1 PUSCH resource. For example: preamble 0 is associated with PUSCH resources 0 and 1, preamble 1 is associated with PUSCH resources 2 and 3, preamble 2 is associated with PUSCH resource 4, and preamble 3 is associated with PUSCH resource 5.

For SSB1, SSB1 is associated with preambles 4 to 7, and preambles 4 to 7 are associated with PUSCH resources 6 to 11. A method of associating preambles 4 to 7 with PUSCH resources 6 to 11 is similar to the method of associating the preambles 0 to 3 with PUSCH resources 0 to 5. Details are not described herein again.

For SSB2, SSB2 is associated with preambles 8 to 11, and preambles 8 to 11 are associated with PUSCH resources 12 to 17. A method of associating preambles 8 to 11 with PUSCH resources 12 to 17 is similar to the method of associating the preambles 0 to 3 with PUSCH resources 0 to 5. Details are not described herein again.

For SSB3, SSB3 is associated with the preambles 12 to 15, and preambles 12 to 15 are associated with PUSCH resources 18 to 23. A method of associating preambles 12 to 15 with PUSCH resources 18 to 23 is similar to the method of associating the preambles 0 to 3 with PUSCH resources 0 to 5. Details are not described herein again.

Manner 2: when R is greater than or equal to N, Q of the N PUSCH resources are associated with ceil(R, N) random access preambles, and (N-Q) of the N PUSCH resources are associated with floor(R, N) random access preambles; where Q=mod(R, N).

Manner 2 is described below with reference to specific scenarios.

Figure 7:
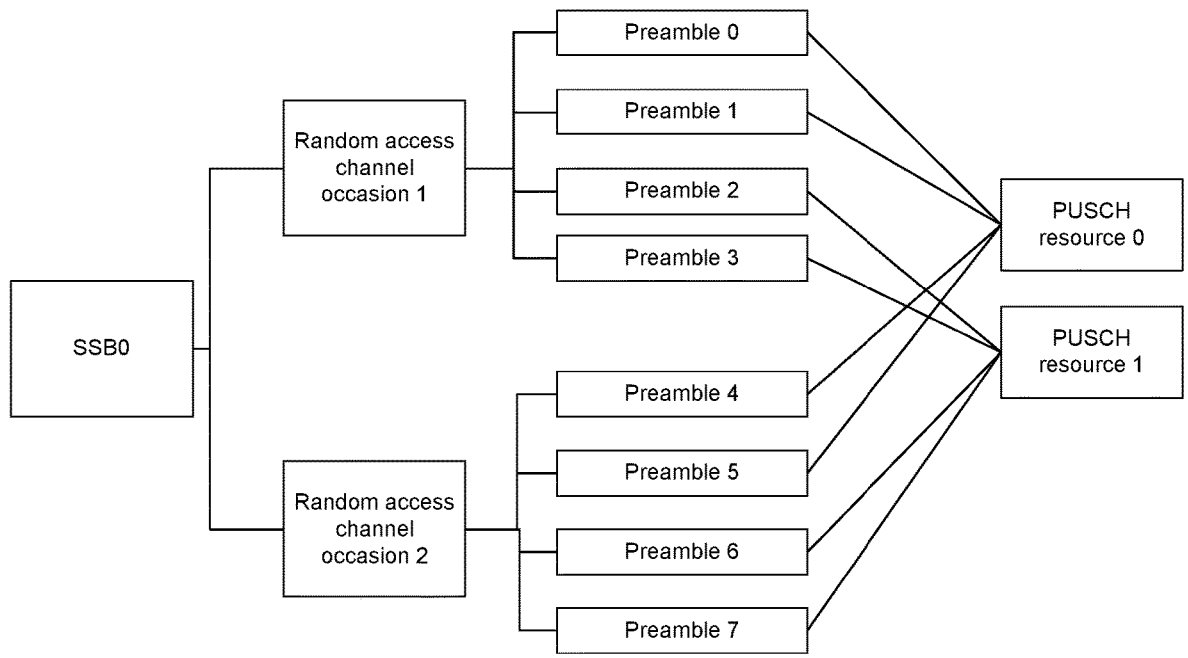
FIG. 7 is a fifth schematic diagram of a mapping relationship between a PUSCH and a PRACH according to an embodiment of the present disclosure.

Scenario 5:

The terminal is configured with $N_{PUSCH\_total}$ PUSCH resources. N=2 PUSCH resources (including time domain and frequency domain and/or DMRS ports) associated with 1 SSB, 1 SSB is associated with 2 ROs, and $N_{PUSCH\_total}$ is greater than or equal to N, as shown in FIG. 7.

SSB0 is associated with PUSCH resources 0 to 1.

The random access channel occasion RO1 can be used to send R=4 preambles such as preambles 0 to 3, and these 4 preambles (preambles 0 to 3) are associated with SSB0.

In RO1, 2-mod(4, 2)=2 PUSCH resources, that is, PUSCH resources 0 and 1, which are respectively associated with floor(4, 2)=2 preambles in these 4 preambles (preambles 0 to 3). For example: PUSCH resource 0 is associated with preambles 0 and 1, and PUSCH resource 1 is associated with preambles 2 and 3.

RO2 can be used to send preambles 4 to 7, and these 4 preambles (preambles 4 to 7) are associated with SSB0.

In RO2, a method of associating these 4 preambles (preambles 4 to 7) with PUSCH resources 0 and 1 is similar to the method of associating the preambles 0 to 3 with PUSCH resources 0 and 1 (as shown in FIG. 7, details are not described herein again).

An embodiment of the present disclosure further provides a preset mapping relationship between a PUSCH and a PRACH.

Each random access preamble in an X group is associated with a PUSCH resource in a Y group, and each random access preamble in an (M-X) group is associated with a PUSCH resource in an (M-Y) group; where M is a positive integer, X=mod(R, M), and Y=mod(N, M).

Specific descriptions are provided below with reference to specific scenarios.

Figure 8:
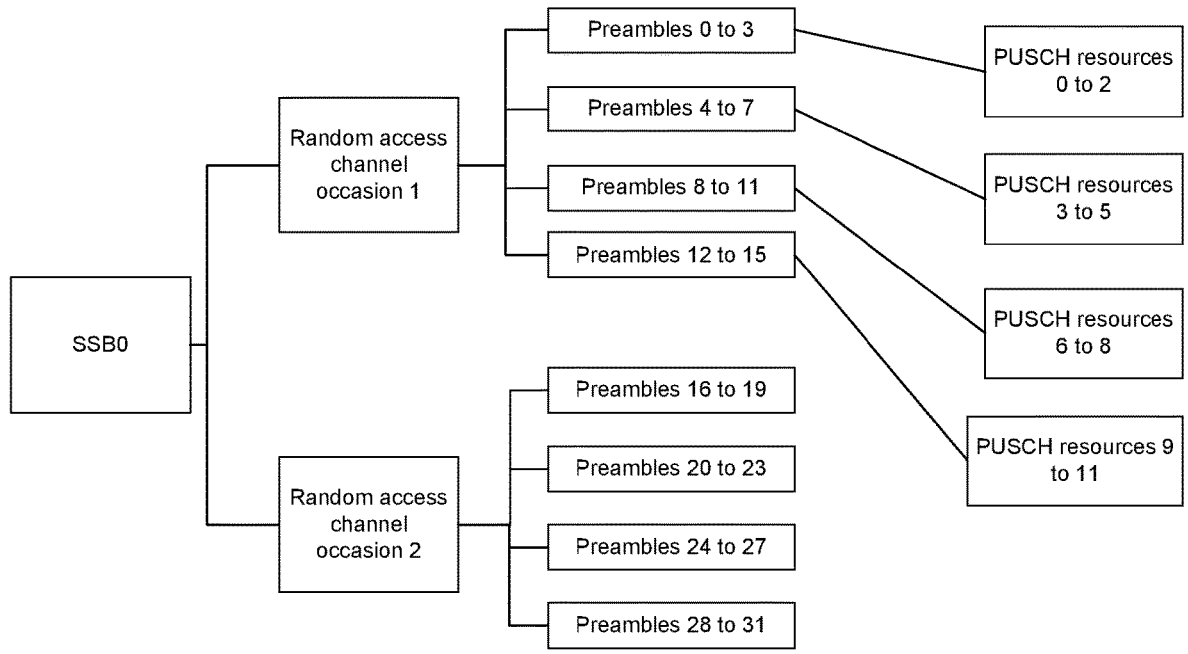
FIG. 8 is a sixth schematic diagram of a mapping relationship between a PUSCH and a PRACH according to an embodiment of the present disclosure.

Scenario 6:

The terminal is configured with $N_{PUSCH\_total}$ PUSCH resources. N=12 PUSCH resources (including time domain and frequency domain and/or DMRS ports) associated with 1 SSB, 1 SSB is associated with 2 ROs, and $N_{PUSCH\_total}$ is greater than or equal to N, as shown in FIG. 8.

SSB0 is associated with PUSCH resources 0 to 11.

The random access channel occasion RO1 can be used to send R=16 preambles such as preambles 0 to 15, and these 16 preambles are associated with SSB0.

In RO1, these 16 preambles are divided into M=4 groups. For example: 4-mod(16,4)=4 groups of preambles, each group includes floor(16,4)=4 preambles; 4-mod(12,4)=4 groups of PUSCH resources, and each group includes floor(12,4)=3 PUSCH resources.

One group of preambles are associated with one PUSCH resource. For example: the first group of preambles 0 to 3 are associated with the first group of PUSCH resources 0 to 2, the second group of preambles 4 to 7 are associated with the second group of PUSCH resources 3 to 5, the third group of preambles 8 to 11 are associated with the third group of PUSCH resources 6 to 8, and the fourth group of preambles 12 to 15 are associated with the fourth group of PUSCH resources 9 to 11. It should be noted that the first group, the second group, the third group, and the fourth group herein are not intended to limit the order.

In some embodiments, any one preamble in a group of preambles is associated with any PUSCH resource in a group of PUSCH resources associated with the group of preambles. For example, preamble 0 in a group of preambles 0 to 3 is associated with a group of PUSCH resources 0 to 2, preamble 1 is associated with PUSCH resources 0 to 2, preamble 2 is associated with PUSCH resources 0 to 2, and preamble 3 is associated with PUSCH resources 0 to 2. In addition, a method of associating a group of preambles and a group of PUSCH resources can also be the above manner 1 and manner 2. Details are not described herein again.

RO2 can be used to send preambles 16 to 31, and these 16 preambles are associated with SSB0.

In RO2, these 16 preambles are also divided into 4 groups that are associated with PUSCH resources 0 to 11, which is similar to the method of RO1. Details are not described herein again.

Figure 9:
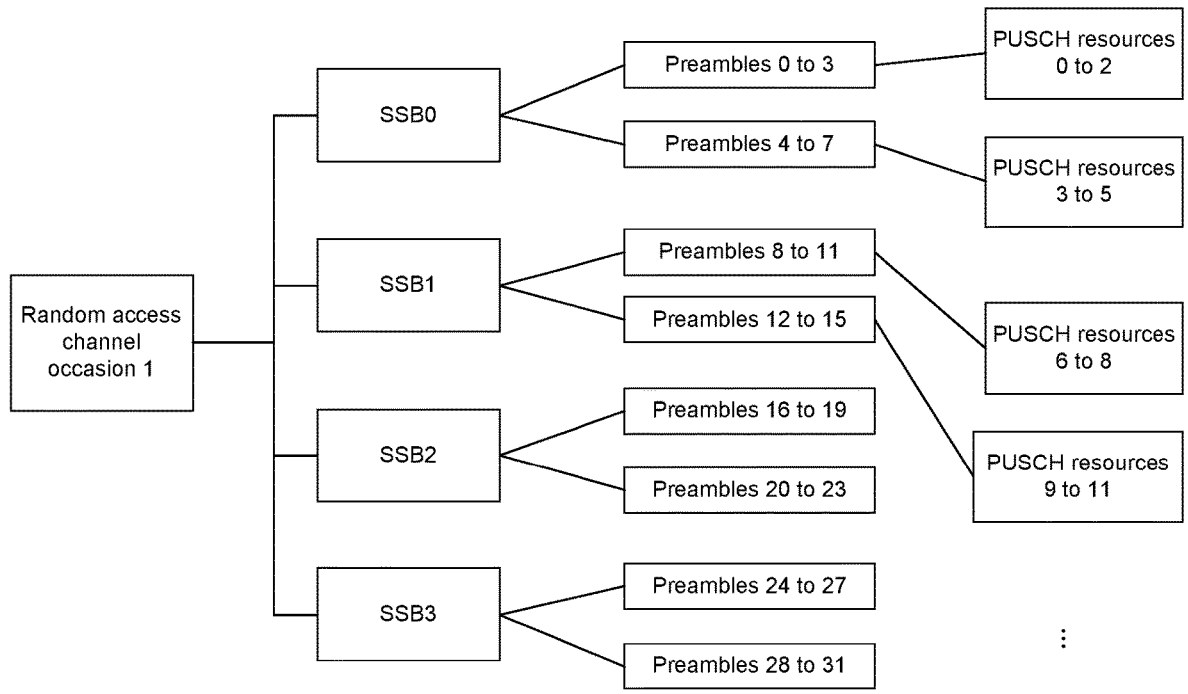
FIG. 9 is a seventh schematic diagram of a mapping relationship between a PUSCH and a PRACH according to an embodiment of the present disclosure.

Scenario 7:

The terminal is configured with $N_{PUSCH\_total}$ PUSCH resources. N=6 PUSCH resources (including time domain and frequency domain and/or DMRS ports) associated with 1 SSB, 4 SSBs are associated with 1 RO, and $N_{PUSCH\_total}$ is greater than or equal to N, as shown in FIG. 9.

SSBs 0 to 3 are associated with the random access channel occasion RO1.

The RO1 can be used to send 32 preambles such as preambles 0 to 31, and R=8 preambles are associated with 1 SSB. For example, SSB0 is associated with preambles 0 to 7, SSB1 is associated with preambles 8 to 15, SSB2 is associated with preambles 16 to 23, and SSB3 is associated with preambles 24 to 31.

For one SSB, 8 preambles are divided into M=2 groups.

For SSB0, preambles 0 to 7 are associated with PUSCH resources 0 to 5.

Preambles 0 to 7 are divided into 2-mod(8,2)=2 groups. For example: each group can include floor(8,2)=4 preambles, that is, one group of preambles 0 to 3 and the other group of preambles 4 to 7. PUSCH resources 0 to 5 are divided into 2-mod(6,2)=2 groups. For example: each group includes floor(6,2)=3 PUSCH resources, that is, one group of PUSCH resources 0 to 2 and the other group of PUSCH resources 3 to 5.

The two groups of preambles are associated with the two groups of PUSCH resources, for example, one group of preambles 0 to 3 are associated with one group of PUSCH resources 0 to 2, and the other group of preambles 4 to 7 are associated with another group of PUSCH resources 3 to 5.

In some embodiments, any one preamble in a group of preambles may be associated with any PUSCH resource in a group of PUSCH resources associated with the group of preambles. For example, preamble 0 in a group of preambles 0 to 3 is associated with PUSCH resources 0 to 2, preamble 1 is associated with PUSCH resources 0 to 2, preamble 2 is associated with PUSCH resources 0 to 2, and preamble 3 is associated with PUSCH resources 0 to 2. In addition, a method of associating a group of preambles and a group of PUSCH resources can also be the above manner 1 and manner 2. Details are not described herein again.

For SSB1, a method of associating preambles 8 to 15 with PUSCH resources 6 to 11 is similar to the method of associating the preambles 0 to 7 with PUSCH resources 0 to 5. Details are not described herein again.

For SSB2, a method of associating preambles 16 to 23 with PUSCH resources 12 to 17 is similar to the method of associating the preambles 0 to 7 with PUSCH resources 0 to 5. Details are not described herein again.

For SSB3, a method of associating preambles 24 to 31 with PUSCH resources 18 to 24 is similar to the method of associating the preambles 0 to 7 with PUSCH resources 0 to 5. Details are not described herein again.

At least a part of time-frequency domain resources of at least two PUSCH resources corresponding to the PRACH resource does not overlap.

For example: multiple PUSCH resources have a same frequency domain resource in frequency domain and different time domain resources in time domain; multiple PUSCH resources have a same frequency domain bandwidth in frequency domain, but have different time domain resources in time domain; multiple PUSCH resources have different frequency domain resources in frequency domain and a same time domain resource in time domain; multiple PUSCH resources have different frequency domain resources in frequency domain, and have the same length of time in time domain but can have different start positions.

The same frequency domain resource can be that the size, the start time, and the end time are the same; different frequency domain resources can be that at least one of the size, the start time, or the end time is different; the same time domain resource can be that at least one of the length of time, the start time, or the end time is different; and different time domain resources can be that at least one of the time length, the start time, or the end time is different.

When the RO corresponding to the PRACH resource is not associated with an SSB, the RO is not associated with the PUSCH resource.

In the embodiments of the present disclosure, when the terminal initiates the random access process, according to the mapping relationship between the PUSCH and the PRACH, the random access message is sent on the random access resource, to ensure that after the network device side detects a PRACH preamble of the random access message, the PUSCH resource can be determined in the same method, so that the network device side and the terminal can reach a consistent understanding. This avoids that the network device needs to blindly detect all possible PRACH and PUSCH transmission positions, thereby reducing processing complexity of the network device.

In addition, if multiple terminals that send the random access message use a same PRACH preamble, because there is a many-to-many correspondence between PRACH resources and PUSCH resources, after the network device detects the preamble, the network device can detect and receive the PUSCH of the random access message according to different PUSCH resources associated with the preamble, which is conducive to improving the access success rate.

The information transmission methods for a random access process in different scenarios are separately described in detail in the foregoing embodiment. A terminal corresponding to the method is further described in the following embodiment with reference to the accompanying drawings.

Figure 10:
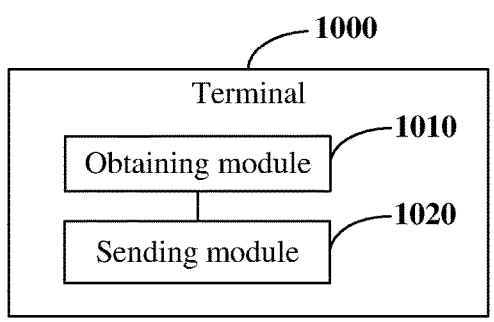
FIG. 10 is a block diagram of a terminal according to an embodiment of the present disclosure.

As shown in FIG. 10, the terminal 1000 of the embodiments of the present disclosure can implement details of the method in the foregoing embodiment: obtaining a preset mapping relationship between a physical uplink shared channel PUSCH resource and a physical random access channel PRACH resource; and sending a random access message on a random access resource according to the preset mapping relationship, where the random access resource includes the PUSCH resource and the PRACH resource, and achieve the same effect. The terminal 1000 includes the following functional modules:

an obtaining module 1010, configured to obtain a preset mapping relationship between a physical uplink shared channel PUSCH resource and a physical random access channel PRACH resource; and a sending module 1020, configured to send a random access message on a random access resource according to the preset mapping relationship, where the random access resource includes the PUSCH resource and the PRACH resource.

The preset mapping relationship includes:

a first mapping relationship between the PUSCH resource of the random access resource and a random access channel occasion RO corresponding to the PRACH resource; or, a second mapping relationship between the PUSCH resource of the random access resource and a synchronization signal block SSB corresponding to the PRACH resource.

The first mapping relationship indicates that a PUSCH resource is associated with at least two RO, where one RO corresponds to at least one random access preamble.

The second mapping relationship indicates that one PUSCH resource is associated with at least two SSBs, where one SSB corresponds to a random access preamble of at least one RO.

The first mapping relationship indicates that N PUSCH resources are associated with one RO, where one RO corresponds to R random access preambles, and N and R are both positive integers.

The second mapping relationship indicates that N PUSCH resources are associated with one SSB, where one SSB corresponds to R random access preambles of one RO, and N and R are both positive integers.

Each of the R random access preambles is associated with the N PUSCH resources.

When R is less than N, P of the R random access preambles are associated with ceil(N, R) PUSCH resources, and (R-P) of the R random access preambles are associated with floor(N, R) PUSCH resources; where P=mod(N, R).

When R is greater than or equal to N, Q of the N PUSCH resources are associated with ceil(R, N) random access preambles, and (N-Q) of the N PUSCH resources are associated with floor(R, N) random access preambles; where Q=mod(R, N).

Each random access preamble in an X group is associated with a PUSCH resource in a Y group, and each random access preamble in an (M-X) group is associated with a PUSCH resource in an (M-Y) group; where M is a positive integer, X=mod(R, M), and Y=mod(N, M).

At least a part of time-frequency domain resources of at least two PUSCH resources corresponding to the PRACH resource does not overlap.

When the RO corresponding to the PRACH resource is not associated with an SSB, the RO is not associated with the PUSCH resource.

It should be noted that in the embodiments of the present disclosure, when the terminal 1000 initiates the random access process, according to the mapping relationship between the PUSCH and the PRACH, the random access message is sent on the random access resource, to ensure that after the network device side detects a PRACH preamble of the random access message, the PUSCH resource can be determined in the same method, so that the network device side and the terminal can reach a consistent understanding. This avoids that the network device needs to blindly detect all possible PRACH and PUSCH transmission positions, thereby reducing processing complexity of the network device.

In addition, if multiple terminals that send the random access message use a same PRACH preamble, because there is a many-to-many correspondence between PRACH resources and PUSCH resources, after the network device detects the preamble, the network device can detect and receive the PUSCH of the random access message according to different PUSCH resources associated with the preamble, which is conducive to improving the access success rate.

It should be noted that, division of the modules of the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or indications in the form of software.

For example, the above modules can be configured into one or more integrated circuits to perform the above methods, such as: one or more application specific integrated circuits (ASIC), one or more digital signal processors (DSP), one or more field programmable gate arrays (FPGA), or the like. For another example, when a module above is implemented by invoking program code by using a processing element, the processing element may be a general-purpose processor, for example, a central processing unit (CPU) or another processor that can invoke program code. For another example, these modules may be integrated together and implemented in the form of a system-on-a-chip (SOC).

Figure 11:
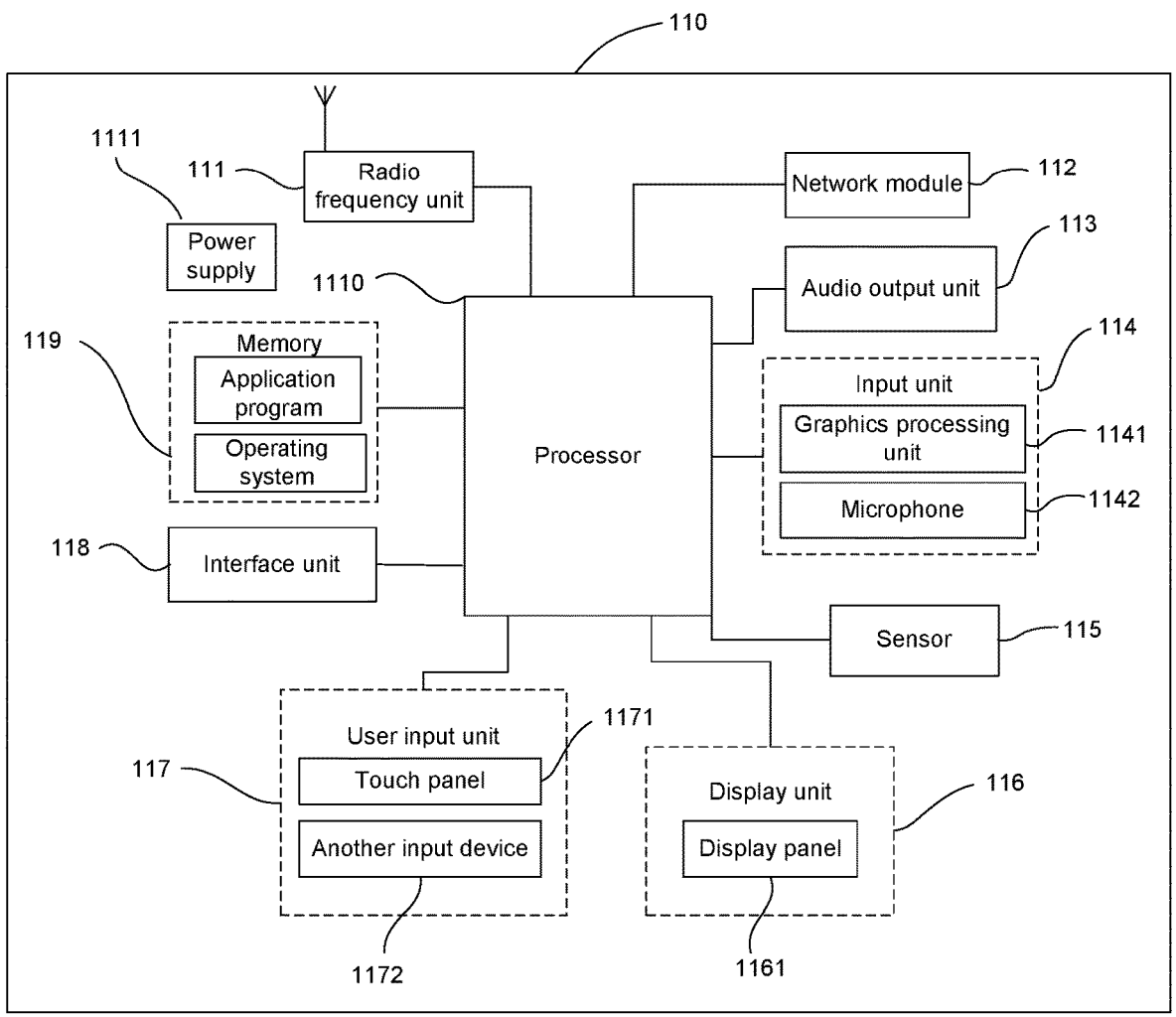
FIG. 11 is a schematic diagram of a hardware structure of a terminal according to an embodiment of the present disclosure.

To better implement the foregoing objective, FIG. 11 is a schematic structural diagram of hardware of a terminal according to the embodiments of the present disclosure. A terminal 110 includes, but is not limited to components such as a radio frequency unit 111, a network module 112, an audio output unit 113, an input unit 114, a sensor 115, a display unit 116, a user input unit 117, an interface unit 118, a memory 119, a processor 1110, and a power supply 1111. Those skilled in the art may understand that the terminal structure shown in FIG. 11 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 111 is configured to obtain a preset mapping relationship between a physical uplink shared channel PUSCH and a physical random access channel PRACH; and send the random access message on the random access resource according to the preset mapping relationship, where the random access resource includes the PUSCH resource and the PRACH resource.

The processor 1110 is configured to control the radio frequency unit 111 to send and receive data.

In the embodiments of the present disclosure, when the terminal initiates the random access process, according to the mapping relationship between the PUSCH and the PRACH, the random access message is sent on the random access resource, to ensure that after the network device side detects a PRACH preamble of the random access message, the PUSCH resource can be determined in the same method, so that the network device side and the terminal can reach a consistent understanding. This avoids that the network device needs to blindly detect all possible PRACH and PUSCH transmission positions, thereby reducing processing complexity of the network device.

In addition, if multiple terminals that send the random access message use a same PRACH preamble, because there is a many-to-many correspondence between PRACH resources and PUSCH resources, after the network device detects the preamble, the network device can detect and receive the PUSCH of the random access message according to different PUSCH resources associated with the preamble, which is conducive to improving the access success rate.

It should be understood that in the embodiments of the present disclosure, the radio frequency unit 111 can be configured to receive and send information or receive and send signal during calls. For example, the radio frequency unit 111 receives downlink data from a base station, and transmits the downlink data to the processor 1110 for processing. In addition, the radio frequency unit 111 sends uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may also communicate with another device through a wireless communications system and network.

The terminal provides wireless broadband Internet access for a user by using the network module 112, for example, helps the user send and receive an email, browse a web page, and access streaming media.

The audio output unit 113 may convert audio data received by the radio frequency unit 111 or the network module 112 or stored in the memory 119 into an audio signal, and output the audio signal into sound. In addition, the audio output unit 113 may further provide audio output (for example, call signal receiving sound or message receiving sound) related to a specific function performed by the terminal 110. The audio output unit 113 includes a loudspeaker, a buzzer, a receiver, and the like.

The input unit 114 is configured to receive audio or video signals. The input unit 114 may include a graphics processing unit (GPU) 1141 and a microphone 1142. The graphics processing unit 1141 processes image data of a static image or a video obtained by an image capturing apparatus (such as, a camera) in a video capturing mode or an image capturing mode. A processed image frame may be displayed on the display unit 116. The image frame processed by the graphics processing unit 1141 may be stored in the memory 119 (or another storage medium) or sent by using the radio frequency unit 111 or the network module 112. The microphone 1142 may receive a sound and can process such sound into audio data. Processed audio data may be converted, in telephone call mode, into a format that can be sent to a mobile communication base station via the radio frequency unit 111 for output.

The terminal 110 further includes at least one sensor 115, such as a light sensor, a motion sensor, and another sensor. For example, the light sensor includes an ambient light sensor and a proximity sensor, where the ambient light sensor can adjust brightness of a display panel 1161 based on brightness of ambient light, and the proximity sensor can turn off the display panel 1161 and/or backlight when the terminal 110 is moved towards the ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein again.

The display unit 116 is configured to display information entered by a user or information provided for the user. The display unit 116 may include a display panel 1161, and the display panel 1161 may be configured in a form of liquid crystal display (LCD), organic light-emitting diode (OLED), or the like.

The user input unit 117 can be configured to receive input numeric or character information, and generate key signal inputs related to user settings and function control of the terminal. For example, the user input unit 117 includes a touch panel 1171 and other input devices 1172. The touch panel 1171, also called a touch screen, may collect a touch operation of the user on or near the touch panel 1171 (For example, the user uses any suitable object or accessory such as a finger or a stylus to operate on or near the touch panel 1171). The touch panel 1171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 1110, receives a command sent by the processor 1110, and executes the command. In addition, the touch panel 1171 may be implemented in various types such as resistive, capacitive, infrared, and surface acoustic wave. In addition to the touch panel 1171, the user input unit 117 may further include the another input device 1172. For example, the another input device 1172 may include but is not limited to a physical keyboard, a function key (such as a volume control key or an on/off key), a trackball, a mouse, a joystick, and the like. Details are not described herein.

Further, the touch panel 1171 may cover the display panel 1161. When detecting a touch operation on or near the touch panel 1171, the touch panel 1171 transmits the touch operation to the processor 1110 to determine a type of a touch event. Then the processor 1110 provides corresponding visual output on the display panel 1161 based on the type of the touch event. Although in FIG. 11, the touch panel 1171 and the display panel 1161 are configured as two independent components to implement input and output functions of the terminal, in some embodiments, the touch panel 1171 and the display panel 1161 can be integrated to implement the input and output functions of the terminal. Details are not limited herein.

The interface unit 118 is an interface connecting an external apparatus to the terminal 110. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 118 can be configured to receive an input (for example, data information and power) from the external apparatus and transmit the received input to one or more elements in the terminal 110, or transmit data between the terminal 110 and the external apparatus.

The memory 119 may be configured to store a software program as well as every kind of data. The memory 119 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 119 may include a high-speed random access memory or a nonvolatile memory, for example, at least one disk storage device, a flash memory, or another volatile solid-state storage device.

The processor 1110 is a control center of the terminal, and connects all parts of the entire terminal by using various interfaces and lines. By running or executing a software program and/or a module stored in the memory 119 and invoking data stored in the memory 119, the processor 1110 performs various functions of the terminal and data processing, to perform overall monitoring on the terminal. The processor 1110 can include one or more processing units. Preferably, the processor 1110 can be integrated with an application processor and a modem processor. The application processor mainly processes the operating system, the user interface, applications, and the like. The modem processor mainly processes wireless communication. It may be understood that alternatively, the modem processor may not be integrated into the processor 1110.

The terminal 110 may further include the power supply 1111 (such as a battery) that supplies power to each component. Preferably, the power supply 1111 may be logically connected to the processor 1110 by using a power management system, so as to implement functions such as charging, discharging, and power consumption management by using the power management system.

In addition, the terminal 110 includes some function modules that are not shown. Details are not described herein.

Preferably, an embodiment of the present disclosure further provides a terminal, including a processor 1110, a memory 119, a computer program stored in the memory 119 and executable on the processor 1110. When the computer program is executed by the processor 1110, the processes of the embodiment of the information transmission method for a random access process are implemented, with the same technical effect achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, a personal communication service (PCS) telephone, a cordless telephone, a session initiation protocol (SIP) telephone, a wireless local loop (WLL) station, a personal digital assistant (PDA) and other devices. The wireless terminal may also be referred to as a system, a subscriber unit, a subscriber station, a mobile station, a mobile console (Mobile), a remote station, a remote terminal, an access terminal, a user terminal, a user agent, or a user device or user equipment. This is not limited herein.

An embodiment of the present disclosure further provides a non-transitory computer-readable storage medium, where the non-transitory computer-readable storage medium stores a computer program. When the computer program is executed by a processor, the processes of the embodiment of the information transmission method for a random access process are implemented, with the same technical effects achieved. To avoid repetition, details are not described again herein. The non-transitory computer-readable storage medium is, for example, a read-only memory (ROM), a random access memory (RAM), a magnetic disk, or an optical disc.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

In addition, it should be noted that in the apparatuses and methods of this disclosure, it is obvious that the components or the steps may be divided and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The above embodiments are preferred embodiments of the present disclosure. It should be noted that, within the technical concept of the present disclosure, those ordinarily skilled in the art can make various improvements and modifications, which shall all fall within the protective scope of the present disclosure.

What is claimed is:

1. An information transmission method for a random access process, applied to a terminal side, wherein the information transmission method for a random access process comprises:
    obtaining a preset mapping relationship between a physical uplink shared channel (PUSCH) resource and a physical random access channel (PRACH) resource; and
    sending a random access message on a random access resource according to the preset mapping relationship, wherein the random access resource comprises the PUSCH resource and the PRACH resource; wherein
    at least a part of time-frequency domain resources of at least two PUSCH resources corresponding to the PRACH resource does not overlap; wherein
    the preset mapping relationship comprises a first mapping relationship between the PUSCH resource of the random access resource and a random access channel occasion (RO) corresponding to the PRACH resource; and the first mapping relationship indicates that N PUSCH resources are associated with one RO, wherein one RO corresponds to R random access preambles, and N and R are both positive integers;
    or
    the preset mapping relationship comprises a second mapping relationship between the PUSCH resource of the random access resource and a synchronization signal block (SSB) corresponding to the PRACH resource; and the second mapping relationship indicates that N PUSCH resources are associated with one SSB, wherein one SSB corresponds to R random access preambles of one RO, and N and R are both positive integers;
    wherein when R is less than N, P of the R random access preambles are associated with ceil(N, R) PUSCH resources, and (R-P) of the R random access preambles are associated with floor(N, R) PUSCH resources; wherein P=mod(N, R); and wherein ceil(N,R) is a rounding up function, floor (N,R) is a rounding down function, and mod(N,R) is a modulo function.

2. The information transmission method for a random access process according to claim 1, wherein each of the R random access preambles is associated with the N PUSCH resources.

3. The information transmission method for a random access process according to claim 1, wherein when R is greater than or equal to N, Q of the N PUSCH resources are associated with ceil(R, N) random access preambles, and (N-Q) of the N PUSCH resources are associated with floor(R, N) random access preambles; wherein Q=mod(R, N).

4. The information transmission method for a random access process according to claim 1, wherein each random access preamble in an X group is associated with a PUSCH resource in a Y group, and each random access preamble in an (M-X) group is associated with a PUSCH resource in an (M-Y) group; wherein M is a positive integer, X=mod(R, M), and Y=mod(N, M).

5. A terminal, wherein the terminal comprises a processor, a memory, and a computer program stored in the memory and executable on the processor, wherein the computer program, when executed by the processor, causes the terminal to perform:
    obtaining a preset mapping relationship between a physical uplink shared channel (PUSCH) resource and a physical random access channel (PRACH) resource; and
    sending a random access message on a random access resource according to the preset mapping relationship, wherein the random access resource comprises the PUSCH resource and the PRACH resource; wherein
    at least a part of time-frequency domain resources of at least two PUSCH resources corresponding to the PRACH resource does not overlap; wherein
    the preset mapping relationship comprises a first mapping relationship between the PUSCH resource of the random access resource and a random access channel occasion (RO) corresponding to the PRACH resource; and the first mapping relationship indicates that N PUSCH resources are associated with one RO, wherein one RO corresponds to R random access preambles, and N and R are both positive integers;

or the preset mapping relationship comprises a second mapping relationship between the PUSCH resource of the random access resource and a synchronization signal block (SSB) corresponding to the PRACH resource; and the second mapping relationship indicates that N PUSCH resources are associated with one SSB, wherein one SSB corresponds to R random access preambles of one RO, and N and R are both positive integers;

wherein when R is less than N, P of the R random access preambles are associated with ceil(N, R) PUSCH resources, and (R-P) of the R random access preambles are associated with floor(N, R) PUSCH resources; wherein P=mod(N, R), and wherein ceil(N,R) is a rounding up function, floor (N,R) is a rounding down function, and mod(N,R) is a modulo function.

6. The terminal according to claim 5, wherein each of the R random access preambles is associated with the N PUSCH resources.

7. A non-transitory computer-readable storage medium, wherein the non-transitory computer-readable storage medium stores a computer program, and the computer program, when executed by a processor, causes the processor to perform:

obtaining a preset mapping relationship between a physical uplink shared channel (PUSCH) resource and a physical random access channel (PRACH) resource; and sending a random access message on a random access resource according to the preset mapping relationship, wherein the random access resource comprises the PUSCH resource and the PRACH resource; wherein at least a part of time-frequency domain resources of at least two PUSCH resources corresponding to the PRACH resource does not overlap; wherein the preset mapping relationship comprises a first mapping relationship between the PUSCH resource of the random access resource and a random access channel occasion (RO) corresponding to the PRACH resource; and the first mapping relationship indicates that N PUSCH resources are associated with one RO, wherein one RO corresponds to R random access preambles, and N and R are both positive integers;

or the preset mapping relationship comprises a second mapping relationship between the PUSCH resource of the random access resource and a synchronization signal block (SSB) corresponding to the PRACH resource; and the second mapping relationship indicates that N PUSCH resources are associated with one SSB, wherein one SSB corresponds to R random access preambles of one RO, and N and R are both positive integers;

wherein when R is less than N, P of the R random access preambles are associated with ceil(N, R) PUSCH resources, and (R-P) of the R random access preambles are associated with floor(N, R) PUSCH resources; wherein P=mod(N, R); and wherein ceil(N,R) is a rounding up function, floor (N,R) is a rounding down function, and mod(N,R) is a modulo function.

8. The non-transitory computer-readable storage medium according to claim 7, wherein each of the R random access preambles is associated with the N PUSCH resources.

9. The terminal according to claim 5, wherein when R is greater than or equal to N, Q of the N PUSCH resources are associated with ceil(R, N) random access preambles, and (N-Q) of the N PUSCH resources are associated with floor(R, N) random access preambles;

wherein Q=mod(R, N).

10. The terminal according to claim 5, wherein each random access preamble in an X group is associated with a PUSCH resource in a Y group, and each random access preamble in an (M-X) group is associated with a PUSCH resource in an (M-Y) group; wherein M is a positive integer, X=mod(R, M), and Y=mod(N, M).

11. The non-transitory computer-readable storage medium according to claim 7, wherein when R is greater than or equal to N, Q of the N PUSCH resources are associated with ceil(R, N) random access preambles, and (N-Q) of the N PUSCH resources are associated with floor(R, N) random access preambles; wherein Q=mod(R, N).

12. The non-transitory computer-readable storage medium according to claim 7, wherein each random access preamble in an X group is associated with a PUSCH resource in a Y group, and each random access preamble in an (M-X) group is associated with a PUSCH resource in an (M-Y) group; wherein M is a positive integer, X=mod(R, M), and Y=mod(N, M).

* * * * *